UNITED STATES PATENT OFFICE.

WILLIAM G. HAMILTON, OF RAMAPO, NEW YORK, ASSIGNOR TO THE HAMILTON STEELED-WHEEL COMPANY, OF PHILADELPHIA, PA.

IMPROVEMENT IN THE MANUFACTURE OF CAR-WHEELS.

Specification forming part of Letters Patent No. 85,089, dated December 22, 1868; reissue No. 5,298, dated February 25, 1873.

*To all whom it may concern:*

Be it known that I, WILLIAM G. HAMILTON, formerly of the city, county, and State of New York, but now residing at Ramapo, in the county of Rockland and State aforesaid, have invented a certain new and useful Improvement in the Art of Manufacturing Cast Chilled Wheels for Railroads; and the following is a specification of my said invention:

The best cast chilled wheels in use prior to my invention were made from iron; but the extraordinary requirements of our railroad service demand greater strength than has been found derivable from this metal, which, in other respects, possesses all the qualities, including the chilling properties, that are essential in this branch of manufacture, and affords them, too, at a moderate cost. On the other hand, cast-steel, a metal that possesses strength adequate to the aforesaid extraordinary requirements, does not possess the chilling property of iron, and not being susceptible of a chill, a wheel made of cast-steel alone lacks that durability in its wearing-surface which is scarcely less essential than strength in railroad wheels; and their original cost being great, and this cost much enhanced by their rapidly wearing out from this absence of a chilled tread, cast-steel railroad wheels have not been manufactured to any extent, and their manufacture may be deemed substantially impracticable in this country.

It is the object of my improvement to produce a railroad wheel which shall combine the strength of a cast-steel wheel with the durability of the chilled iron wheel, and to render this combination of these two desirable qualities procurable at a reasonable cost. In my experiments directed to the attainment of this result I have used a mixture of cast steel and iron, and a mixture of low steel and iron, in some cases melting the metals together in a cupola or other furnace, and in some cases melting them separately, (the steel or steely metals in the latter case being of course melted in a crucible or air-furnace or gas-furnace,) and mixing them in a molten state; and I have obtained in such cases good results, demonstrating the decided improvement in the art accomplished by my invention.

The iron may be any suitable pig or cast irons, or pig and cast iron mixed in any of the usual well-known ways. The steel may be all cast-steel or all low steel, or mixed cast-steel and low steel.

I also contemplate using, with proper iron, steel in the form of sponge, either alone or with cast-steel, or with low steel, or with both cast-steel and low steel, it being only necessary, in order to make available the essence of my improvement, that the iron should have mixed with it a sufficient proportion of the steel or steely metals above designated to impart to the chilled casting the properties derivable from such a mixture. The relative proportions of the steel or steely metals to the iron cannot be governed by any fixed formula, but must be left in each particular case to the judgment of the mixer, in view of the quality and properties of his materials. It will suffice to say in this regard that I contemplate using in all cases more iron than steel or steely metals, and I give as instances from which I have derived satisfactory results: Iron, say, sixty-seven parts; cast-steel, say, thirty-three parts, or iron, say, sixty parts; low steel, (Bessemer clippings,) say, forty parts. For steel sponge alone I would say at least fifty parts to fifty parts of iron. The metals may be melted separately—the iron in a cupola or other furnace, and the steel or steely metals in a crucible or in an air-furnace or gas-furnace, and mixed together in the molten state; or they may be melted together in a cupola or other furnace, as may be most consistent with the conditions under which they are used, and in any case the molten mixture is run into the chill-molds in the ordinary manner of casting chilled-iron railroad wheels. The product will be a smooth casting having a chilled surface, and also having the quality of resistance to tensile strains in a higher degree than has heretofore been obtained from any metal or mixture of metals which can be cast at a temperature sufficiently low to chill. This result is due, as I suppose, to the fact that the iron and the steel, thus mixed, act and react upon each other in such wise as to form a higher grade of metal than the iron itself, this enhancement in quality extending also to the chilling property of the combined metals. By this means I am enabled to produce a cast chilled wheel having a tensile strength approaching that of cast-steel, with a durability fully equal to that of the best chilled cast-iron heretofore made.

I do not limit or confine myself to any particular method or process of manufacture, as those ordinarily used in the manufacture of chilled cast-iron wheels are deemed by me sufficient for my purposes, and these are well understood.

Having thus described the nature and object of my invention, what I claim is—

As an improvement in the art of manufacturing cast chilled wheels for railroads, making such wheels from a compound of iron and steel or steely metals, substantially as described.

January 8, 1873.

Witnesses: WM. G. HAMILTON.

WM. L. RAYMOND,

JAMES L. RAYMOND.